(12) United States Patent
Cocchi et al.

(10) Patent No.: US 8,978,931 B2
(45) Date of Patent: Mar. 17, 2015

(54) MACHINE FOR MAKING AND DISPENSING SEMILIQUID AND/OR SEMISOLID FOOD PRODUCTS

(75) Inventors: Andrea Cocchi, Calderara di Reno (IT); Roberto Lazzarini, Reggio Emilia (IT)

(73) Assignee: ALI S.p.A. - Carpigiani Group (IT)

( * ) Notice: Subject to any disclaimer, the term of this patent is extended or adjusted under 35 U.S.C. 154(b) by 261 days.

(21) Appl. No.: 13/361,626

(22) Filed: Jan. 30, 2012

(65) Prior Publication Data
US 2012/0199608 A1    Aug. 9, 2012

(30) Foreign Application Priority Data

Feb. 4, 2011    (IT) .............................. BO2011A0047

(51) Int. Cl.
| | |
|---|---|
| B67D 7/84 | (2010.01) |
| A23G 9/22 | (2006.01) |
| A23G 9/28 | (2006.01) |
| B01F 15/06 | (2006.01) |
| A23G 9/04 | (2006.01) |
| A23G 9/30 | (2006.01) |

(52) U.S. Cl.
CPC ............... *A23G 9/225* (2013.01); *A23G 9/288* (2013.01); *B01F 15/068* (2013.01); *A23G 9/224* (2013.01); *A23G 9/045* (2013.01); *A23G 9/22* (2013.01); *A23G 9/30* (2013.01)
USPC ........ 222/146.6; 222/160; 141/284; 141/370; 141/374; 141/376

(58) Field of Classification Search
CPC ....... A23G 9/225; A23G 9/045; A23G 9/283; A23G 9/288; A23G 9/22; A23G 9/30; A23G 9/28; A23G 9/281; A23G 9/00; A23G 9/04; A23G 9/224; B01F 15/068; B01F 7/161
USPC .............. 222/146.6, 160, 608, 612; 141/376, 141/284, 369, 370, 374
See application file for complete search history.

(56) References Cited

U.S. PATENT DOCUMENTS

| | | | | |
|---|---|---|---|---|
| 1,950,160 | A | * | 3/1934 | Blank ........................... 222/160 |
| 2,331,834 | A | * | 10/1943 | Harr ................................ 62/396 |
| 2,361,649 | A | | 10/1944 | Phelan |
| 2,735,583 | A | * | 2/1956 | Misch ........................... 222/129 |

(Continued)

FOREIGN PATENT DOCUMENTS

| | | |
|---|---|---|
| CN | 101028916 A | 9/2007 |
| CN | 101897379 A | 12/2010 |

(Continued)

OTHER PUBLICATIONS

Italian Search Report dated Oct. 12, 2011 from counterpart application.

(Continued)

*Primary Examiner* — J. Casimer Jacyna
(74) *Attorney, Agent, or Firm* — Timothy J. Klima; Shuttleworth & Ingersoll, PLC

(57) ABSTRACT

A machine for making and dispensing semiliquid and/or semisolid food products comprises a frame (2) furnished with a base (4) and an operating unit (6) for processing at least one mixture for making and dispensing the products. The operating unit (6) is movable at least between a raised position and a lowered position relative to the base (4) through the agency of a respective movement means (8).

13 Claims, 2 Drawing Sheets

(56) References Cited

U.S. PATENT DOCUMENTS

| | | | |
|---|---|---|---|
| 4,942,910 A * | 7/1990 | Hamamura | 141/9 |
| 1,418,962 A | 6/1992 | Norcross | |
| 5,499,695 A * | 3/1996 | Doom, Jr. | 187/244 |
| 6,637,214 B1 | 10/2003 | Leitzke et al. | |
| 7,353,850 B2 * | 4/2008 | Greiwe et al. | 141/279 |
| 8,176,950 B2 * | 5/2012 | Luchinger | 141/83 |
| 2001/0035016 A1 * | 11/2001 | Weber et al. | 62/210 |
| 2006/0251783 A1 * | 11/2006 | D'Esposito et al. | 426/438 |
| 2007/0199614 A1 | 8/2007 | Cocchi et al. | |
| 2008/0219090 A1 * | 9/2008 | Heinhold et al. | 366/261 |
| 2010/0122539 A1 | 5/2010 | Cocchi et al. | |
| 2011/0000229 A1 * | 1/2011 | Boekhoorn et al. | 62/56 |
| 2012/0199616 A1 * | 8/2012 | Lamb et al. | 222/608 |

FOREIGN PATENT DOCUMENTS

| | | | | |
|---|---|---|---|---|
| GB | 1303331 | 1/1973 | | |
| WO | 2010/040744 | 4/2010 | | |
| WO | WO2010052057 A1 * | 5/2010 | | G01F 11/00 |

OTHER PUBLICATIONS

Chinese Office Action dated Nov. 1, 2013 from counterpart application No. 201210028603.3.

* cited by examiner

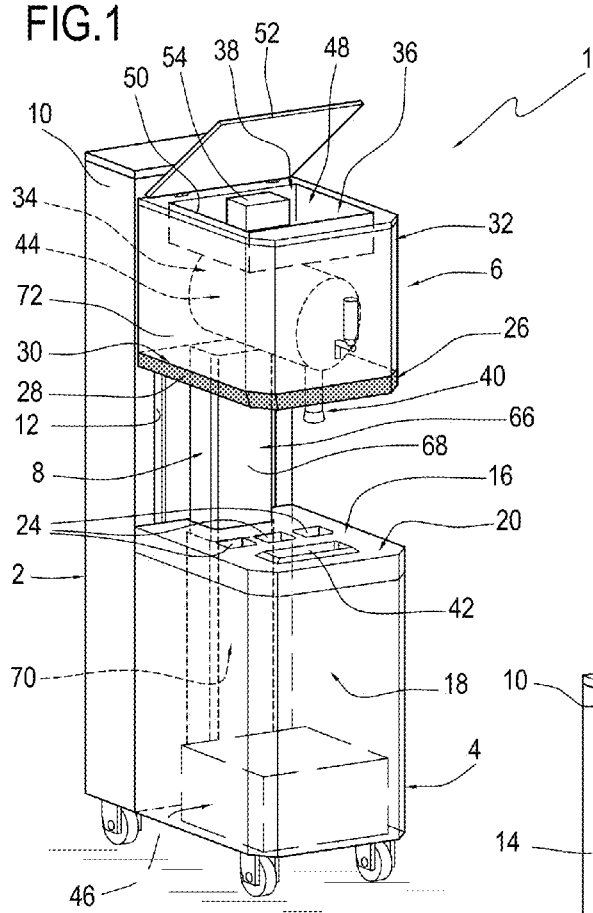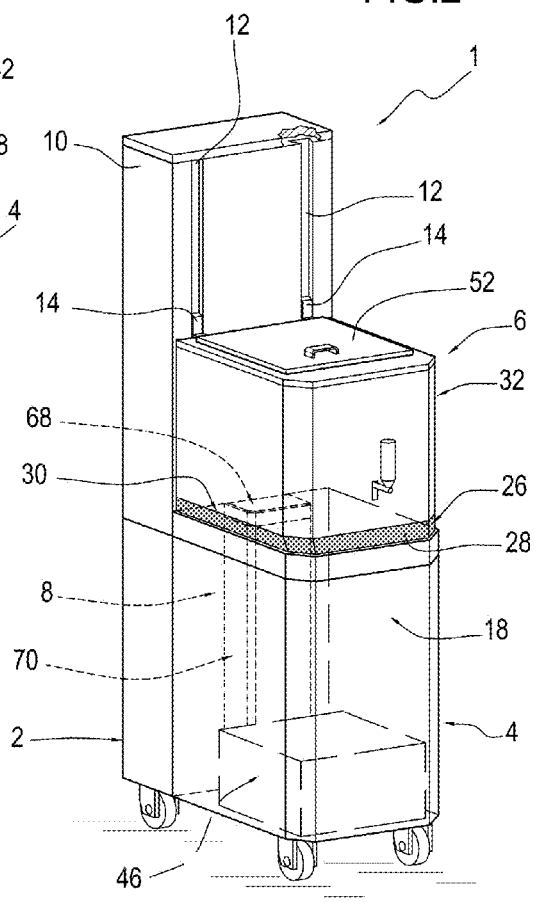

MACHINE FOR MAKING AND DISPENSING SEMILIQUID AND/OR SEMISOLID FOOD PRODUCTS

This application claims priority to Italian Patent Application B02011A000047 filed Feb. 4, 2011, the entirety of which is incorporated by reference herein.

BACKGROUND OF THE INVENTION

This invention relates to a machine for making and dispensing semiliquid and/or semisolid food products such as, for example, soft ice cream or Italian-style ice cream ("gelato") and the like.

As is known, and usually, a machine for making and dispensing ice creams comprises a substantially parallelepiped shaped frame which is elongate along its vertical axis. At the top of it, the frame mounts an operating unit for making and dispensing ice cream.

In the particular case of a soft ice cream machine, the operating unit comprises a tank for containing a base product to be processed and connected through a pump to a mixing and cooling unit, the latter having an ice cream dispensing tap which may be located on the front of the machine frame.

The machine is equipped with a refrigerating unit which comprises a compressor, an evaporator and a condenser associated with the cooling and mixing unit.

In practice, to make the ice cream, the operator fills the containment tank with the base product which is then fed to the mixing and cooling unit through the pump.

Inside the mixing and cooling unit, a helical stirrer mixes the product and at the same time causes it to advance towards the front end of the mixing and cooling unit. At this point, the operator acts on the dispensing tap lever to dispense an ice cream serving.

The base product processed in these machines for professional use is a milk-based mix which is highly perishable. For that reason, the machines must be cleaned and sanitized to prevent the proliferation of bacteria. In particular, great care is taken in the cleaning and sanitizing of the parts of the machine which come into contact with the base product.

Thus, in order to maintain perfectly hygienic conditions, the operating unit for making and dispensing the ice cream is subject to frequent cleaning.

Since cleaning operations may be performed by an operator, the position of the unit for making and dispensing the ice cream is anything but optimal because in prior art machines, the operating unit is at the top of the frame.

The position of the unit for making and dispensing the ice cream is not only inefficient for machine cleaning operations but also for filling the containment tank with the base product. Indeed, the containment tank is made accessible to the operator through a lid which is usually placed at the top of the machine frame.

SUMMARY OF THE INVENTION

This invention has for an aim to provide a machine for making and dispensing semiliquid and/or semisolid food products which overcomes the drawbacks mentioned above with reference to the prior art machines.

The technical purpose indicated and the aims specified are substantially achieved by a machine comprising the technical features described herein.

BRIEF DESCRIPTION OF THE DRAWINGS

Further features and advantages of the invention are more apparent in the detailed description below, with reference to a preferred, non-limiting embodiment of a machine for making and dispensing semiliquid and/or semisolid food products, illustrated in the accompanying drawings, in which:

FIG. 1 is a schematic perspective view of a machine for making and dispensing semiliquid and/or semisolid food products according to the invention, in a first operating configuration;

FIG. 2 is a schematic perspective view of the machine of FIG. 1 in a second operating configuration;

DESCRIPTION OF THE PREFERRED EMBODIMENTS

Figure 3:
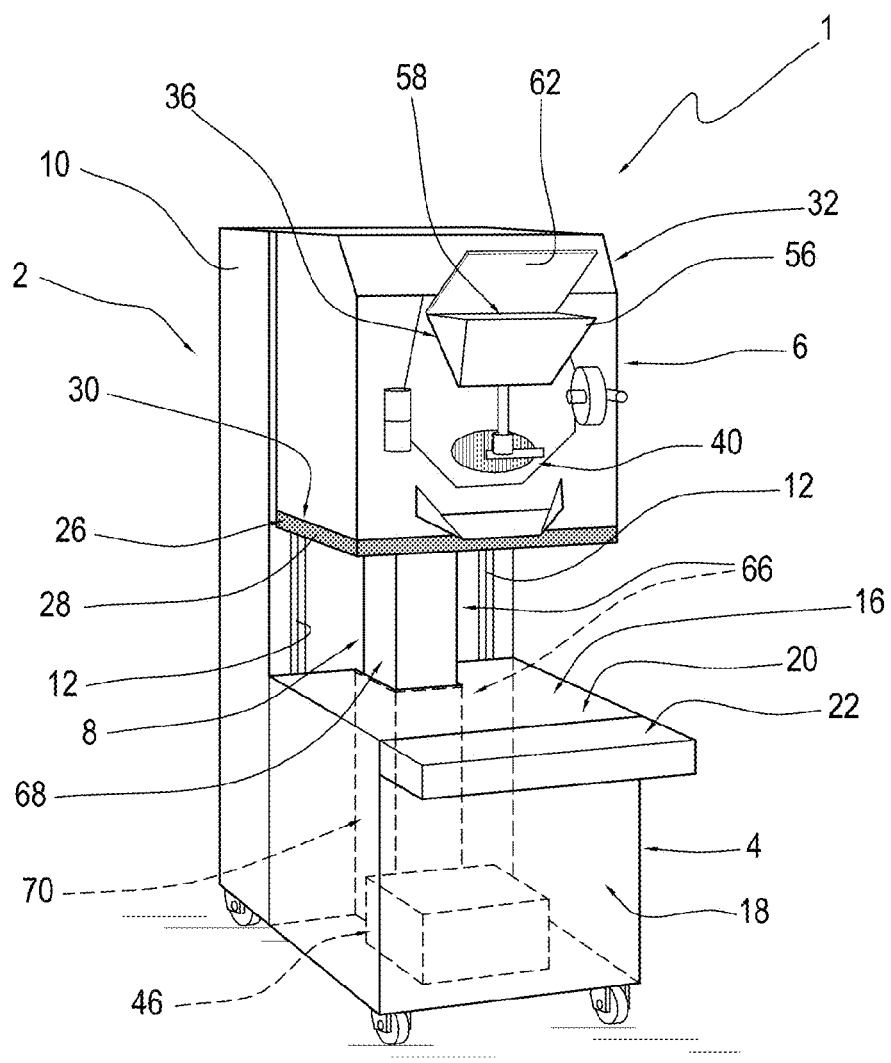
FIG. 3 is a schematic perspective view of a further embodiment of a machine for making and dispensing semiliquid and/or semisolid food products according to the invention.

As illustrated in FIGS. 1 and 2, the numeral 1 denotes in its entirety a machine for making and dispensing semiliquid and/or semisolid food products, comprising a frame 2 which is in turn furnished with a base 4. The frame 2 mounts an operating unit 6 for processing at least one mix for making and dispensing the products. The operating unit is movable at least between a raised position and a lowered position relative to the base.

The machine also comprises a movement means 8 for moving the operating unit 6 at least between the raised position (FIG. 1) and the lowered position (FIG. 2).

The frame comprises a column 10 which is integral with the base 4 at the rear of the base itself and which supports the operating unit 6.

The column 10 comprises at least one linear guide 12 for slidably supporting the operating unit 6.

More specifically, the accompanying drawings show two linear guides 12, which are vertical and parallel with each other and which extend from the base 4 at the top end of the column 10 in such a way as to allow the operating unit 6 to be moved correctly. The operating unit 6 is equipped with respective sliding elements 14 which can be associated with each guide 12.

In the preferred embodiment, the base 4 is substantially in the shape of a parallelepiped and comprises at least one top face 16 and one front face 18. The base 4 presents a worktop 20 which substantially coincides with the top face 16 of the selfsame base 4.

In a first embodiment, the worktop 20 may be used as a surface on which to place containers for holding the finished product at the dispensing stage. In an alternative embodiment, the worktop 20 has a supporting surface 22 contiguous thereto, extending from the front face 18 of the base 4 and used as a surface on which to place containers for holding the finished product when it has been dispensed.

In the first preferred embodiment, the worktop 20 may have at least one housing 24 for accommodating at least one container or tub. The tub may be used to contain toppings which can be added to the product after it has been dispensed. The toppings usually consist of candied fruit pieces, chopped nuts, confectionery, chocolate pieces and the like.

Advantageously, the operating unit 6 is equipped with a protective element 26, providing the worktop 20 with protection against extraneous agents such as dirt, bacteria, humidity, etc., when the machine 1 is not in operation. In this configuration it is preferable to take the operating unit 6 to the lowered position in such a way that the protective element 26 defines for the worktop 20 a screen against the extraneous agents.

The protective element 26 is preferably in the form of a rubber sealing strip 28 extending along the perimeter edge 30 of the operating unit 6.

The operating unit 6 comprises a box-shaped body 32, which houses at least one cooling and mixing unit 34, and at least one receiving element 36 for receiving the mix and located at the infeed of the respective cooling and mixing unit 34.

A mixture feeding means 38 associated with each receiving element 36 is provided for transferring the mixture from the receiving element 36 to the cooling and mixing unit 34.

At the outfeed of the respective cooling and mixing unit 34 there is at least one dispenser 40 for serving the processed product.

More specifically, in the embodiment illustrated in FIGS. 1 and 2, when the operating unit 6 is in the lowered position, the dispenser 40 fits into a receptacle 42 formed in the worktop 20 and used to collect the product dispensed in excess which sticks to the nozzle of the dispenser 40.

The mixing and cooling unit 34 mainly comprises a chamber 44, substantially cylindrical in shape and made of stainless steel, having a substantially horizontal axis of extension X.

Inside the cylinder 44 there is a helical blade for stirring the processed product and which is set in rotation about its axis by a geared motor unit. The rotation of the helical blade stirs the mixture placed in the cooling and mixing unit 34 and pushes the mass of food product being formed towards one end of the cooling and mixing unit 34.

The cooling and mixing unit 34 is connected to a refrigerating system, schematically illustrated as a block 46, for keeping the cooling and mixing unit 34 and the mixture contained therein within a specific temperature range.

The cooling and mixing unit 34 is designed to mix, cool and blend the mixture placed inside it, thereby forming the semiliquid and/or semisolid product.

In the first embodiment, the receiving element 36 is a containment tank 48 for holding the mixture before it is placed in the cooling and mixing unit 34.

The tank 48 is preferably mounted above the mixing and cooling unit 34, has an opening 50 through which the mixture can be placed therein, and may be provided with a lid 52.

The tank 48 has further associated with it a portion, not illustrated, of the refrigerating system 48 to initially cool the mixture and keep it at a predetermined temperature.

The mixture feed means 38 comprises a pump 54, preferably mounted in an upper portion of the tank 48, operates in the tank 48 itself and comprising an intake duct for drawing the mixture in from the tank 48 and a delivery duct for transferring the products taken in to the infeed of the cooling and mixing unit 34.

In the alternative embodiment shown in FIG. 3, the receiving element 36 consists of a funnel element 56 located at the front of the operating unit 6 and has a first opening 58 which may, if necessary, be provided with a lid 62. Further, in the second embodiment, the mixture feed means 38 consists of a duct, not illustrated, formed on the front wall of the box-shaped body 32 and connecting a second opening, not illustrated, of the funnel 56 with the inside of the cooling and mixing unit 34.

The movement means 8 comprises a plurality of hollow tubular elements or stages 66, arranged vertically and forming a telescopic structure for the movement means 8; advantageously, each stage 66 is substantially prismatic in shape, with a quadrilateral cross section.

More specifically, each stage 66 is slidable partially into an adjacent stage 66.

More specifically, during work, for any given pair of adjacent stages 66, the inner stage 66 is moved upwards.

In the preferred embodiment, the movement means 8 comprises a first, upper stage 68 and a second, lower stage 70. The lower stage 70 is connected to the base 4 while the upper stage 68 slides partially into the lower stage 70 and is connected at a first end of it 72 to the operating unit 6. More specifically, the lower stage 70 is fixed and integral with the base 4 and is preferably located inside the base 4 itself.

As shown in the drawing, the upper stage 68 is movable inside the lower stage 70 at least between a first position, corresponding to the raised position of the operating unit 6, and a second position, corresponding to the lowered position of the operating unit 6.

The movement means 8 also comprises an actuating device, of known type and therefore not illustrated, adapted to move the upper stage 68 from the first position to the second and vice versa.

Preferably, the actuating device is of an electromechanical type.

Alternatively, the device may be of a pneumatic type.

Alternatively, the device may be of a hydraulic type.

The refrigerating system 46, preferably located inside the base 4 of the machine 1, comprises a motor-driven compressor, a condenser and an evaporator, and a piping system, of known type and therefore not described or illustrated in detail, in which the refrigerant fluid flows.

More specifically, the piping of the refrigerating system 46, connected to the jacket of the cooling and mixing unit 34, may advantageously be placed inside the telescopic structure of the movement means 8 so that the cooling and mixing unit 34 can continue to be cooled even during the movement of the operating unit 6.

In the same way, the piping of the portion of the refrigerating system for cooling the tank 48 may advantageously be placed inside the telescopic structure of the movement means 8.

Further, the machine 1 comprises a motor, preferably electrical, not illustrated in the drawings, for driving the pump 54, the stirrer of the cooling and mixing unit 34 and the compressor of the refrigerating system 46.

The invention achieves the set aims and brings significant advantages.

The possibility of making the operating unit movable at least between a raised position and a lowered position relative to the base through the agency of the movement means makes it easier both to clean the machine and to fill the tank.

Indeed, the movement means allows the operating unit to be lowered into contact with the protective element of the worktop so as to enable the operator to perform cleaning and filling operations quickly and easily.

Moreover, during periods when the machine is not being used, the operating unit can be kept in the lowered position in contact with the protective element, thereby preventing extraneous agents from dirtying the worktop and contaminating the tubs containing the toppings.

The invention described above is susceptible of industrial application and may be modified and adapted in several ways without thereby departing from the scope of the inventive concept. Moreover, all the details of the invention may be substituted by technically equivalent elements.

What is claimed is:

1. A machine for making and dispensing at least one chosen from a semiliquid and a semisolid food product comprising:
   a frame comprising a base; and
   an operating unit for processing a mixture for making and dispensing the at least one chosen from a semiliquid and a semisolid food product, comprising:
   a box-shaped body enclosing an interior space;
   a cooling and mixing unit having a housing with a chamber formed with the housing and a stirrer positioned in the chamber, the cooling and mixing unit housed in the interior space of the box-shaped body with the housing spaced apart from side walls of the box-shaped body, the cooling and mixing unit for mixing, cooling and blending the mixture to form the at least one chosen from a semiliquid and a semisolid food product; the cooling and mixing unit connected to a refrigerating system for cooling the cooling and mixing unit;

a dispenser for dispensing the at least one chosen from a semiliquid and a semisolid food product and located at an outfeed of the cooling and mixing unit;

wherein the operating unit is movable at least between a raised position and a lowered position relative to the base;

wherein the cooling and mixing unit, the dispenser and the box-shaped body are movable together between the raised position and the lowered position.

2. The machine according to claim 1, comprising a movement mechanism for moving the operating unit at least between the raised position and the lowered position.

3. The machine according to claim 2, wherein the movement mechanism comprises a plurality of stages, the stages forming a telescopic structure for the movement mechanism.

4. The machine according to claim 3, wherein a respective stage is slidable in partial insertion relative to an adjacent stage.

5. The machine according to claim 4, wherein for a respective pair of adjacent stages, an upward movement of the inner stage is defined.

6. The machine according to claim 3, wherein the movement mechanism has a first, upper stage and a second, lower stage, the upper stage being partially inserted in the lower stage; the lower stage being connected to the base and the upper stage being connected to the operating unit at a first end.

7. The machine according to claim 6, wherein the lower stage is integral with and inside the base.

8. The machine according to claim 6, wherein the upper stage is movable between a first position, corresponding to the raised position of the operating unit, and a second position, corresponding to the lowered position of the operating unit.

9. The machine according to claim 1, wherein the frame comprises a column, integral with the base and constructed and arranged to support the operating unit.

10. The machine according to claim 9, wherein the column comprises a linear guide for slidably supporting the operating unit.

11. The machine according to claim 1, wherein the operating unit further comprises: a receiving element for receiving the mixture and located at an infeed of the cooling and mixing unit; a feed mechanism for feeding the mixture and associated with the receiving element for transferring the mixture from the receiving element to the cooling and mixing unit.

12. The machine according to claim 1, wherein the base includes a worktop at the top thereof, facing the operating unit; the worktop having a protective element, providing the worktop with protection against extraneous agents when the operating unit is in the lowered position.

13. The machine according to claim 12, wherein the protective element includes a sealing strip extending along the perimeter edge of the worktop.

* * * * *